United States Patent [19]
Mutch

[11] 4,005,836
[45] Feb. 1, 1977

[54] TARGET THRUST REVERSER

[75] Inventor: Henry Mutch, Chula Vista, Calif.

[73] Assignee: Rohr Industries, Inc., Chula Vista, Calif.

[22] Filed: Dec. 22, 1975

[21] Appl. No.: 643,493

[52] U.S. Cl. .................. 244/110 B; 239/265.19; 239/265.43

[51] Int. Cl.² ............... B64C 15/04; B63H 11/10

[58] Field of Search .......... 244/23 D, 12 D, 110 B, 244/113; 60/226 R, 226 A, 230; 239/265.19, 265.21, 265.29, 265.31, 265.33, 265.37, 265.39, 265.43

[56] References Cited
UNITED STATES PATENTS

| | | | |
|---|---|---|---|
| 3,019,599 | 2/1962 | Colley | 239/265.29 |
| 3,330,115 | 7/1967 | Markowski | 244/113 |
| 3,612,399 | 10/1971 | Rodgers et al. | 239/265.29 |
| 3,688,989 | 9/1972 | McMurtry | 239/265.37 |
| R24,703 | 9/1959 | Brame | 239/265.19 |

FOREIGN PATENTS OR APPLICATIONS 1,284,750  8/1972  United Kingdom ......... 239/265.29

Primary Examiner—Trygve M. Blix
Assistant Examiner—Galen L. Barefoot
Attorney, Agent, or Firm—Patrick J. Schlesinger; Frank D. Gilliam

[57] ABSTRACT

A thrust reversal system for an aircraft jet engine comprising a pair of thrust reverser doors constructed of a thin flexible material movable between a stowed and a deployed position and mechanism for moving same.

3 Claims, 4 Drawing Figures

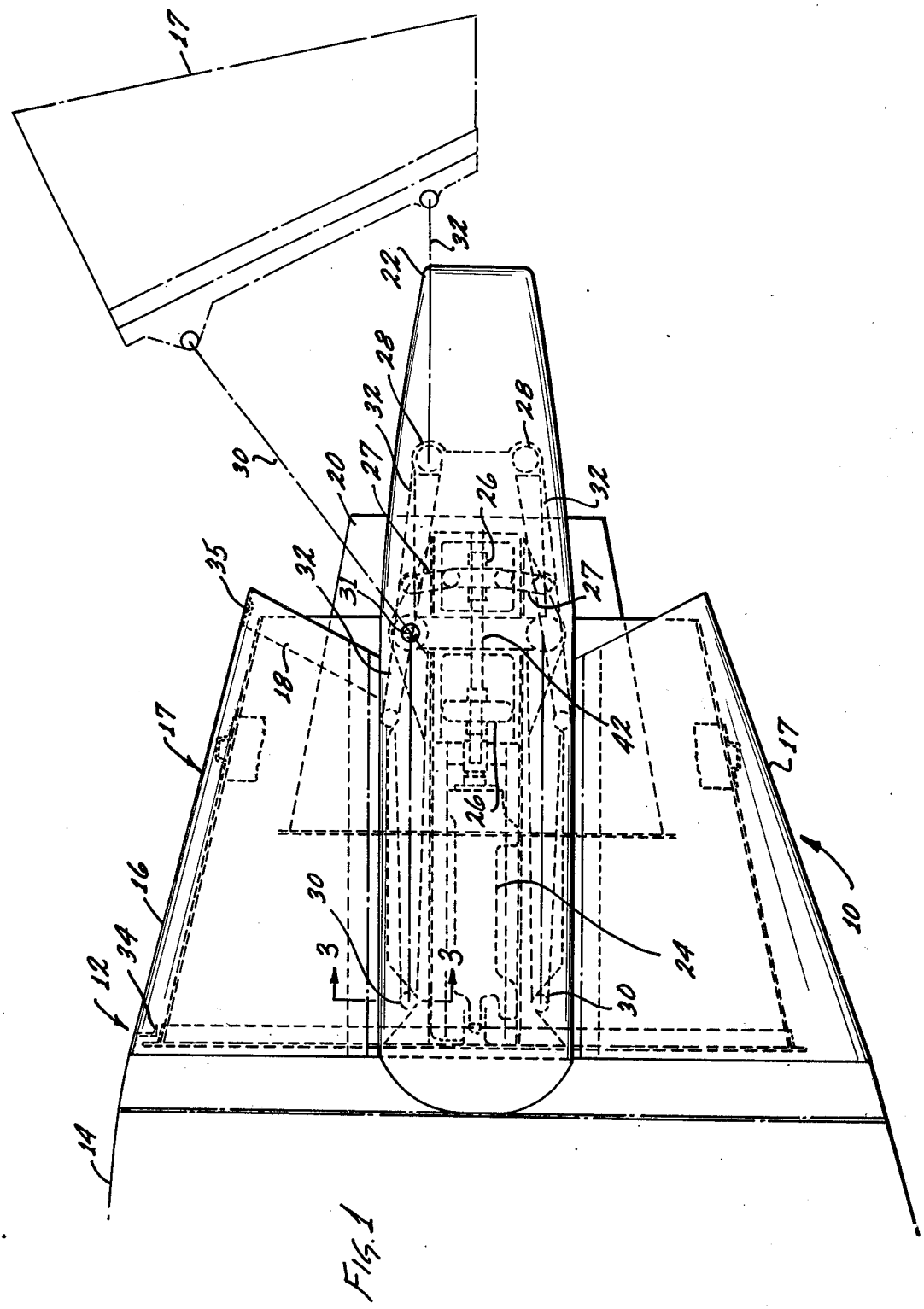
F16.1

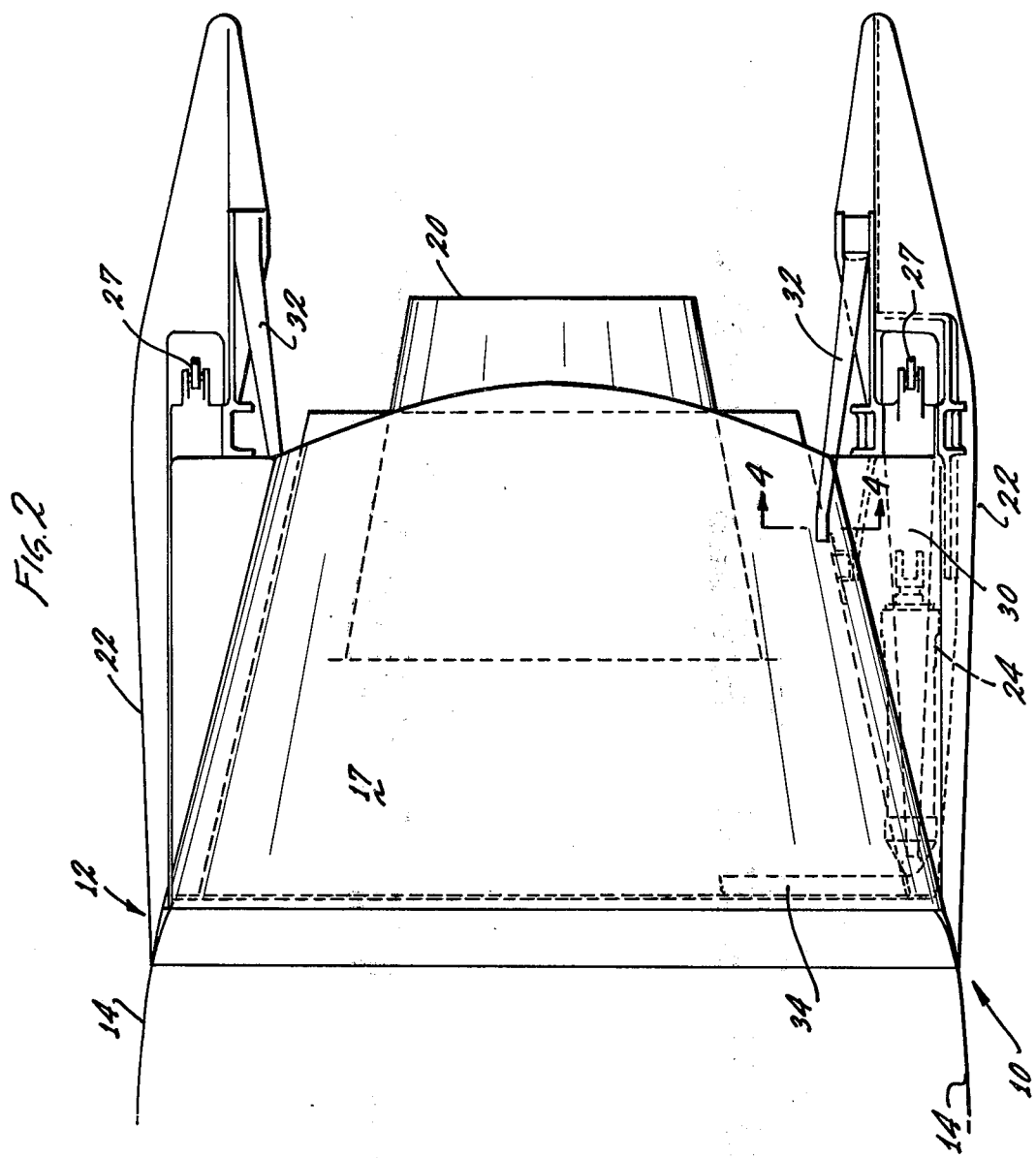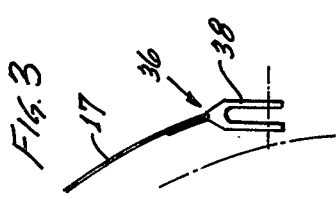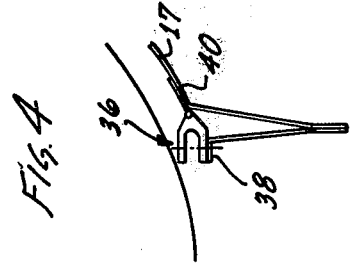

TARGET THRUST REVERSER

BACKGROUND OF THE INVENTION

This invention relates to apparatus for thrust reversal for turbojet engines, particularly for aircraft, where thrust reversal is achieved by means of laterally deployable deflecting elements which are pivoted into the thrust jet downstream of the thrust nozzle.

There are a number of well known conventional successful thrust reversing devices available. The principle consideration in the operation of thrust reversal apparatus is that the device be fail safe in its operation, be sufficiently strong to withstand various loadings encountered, be economical to construct and be of a high strength to weight ratio. The longitudinal edges of the thrust reverser doors are flexibly connected by elongated hinges to rigid members connected to the mechanism for moving the doors.

A majority of the existing devices meet substantially all of the above requirements. The aircraft manufacturers are, however, continuing to improve the existing devices and their main area of concentration is to continue to improve the strength to weight ratio of the reversers.

Clearly if the weight of a reverser meeting all of the other major requirements could be substantially reduced, the reverser would find widespread use on modern aircraft.

Obviously, an improved thrust reverser having all of the necessary requirements above and in addition being substantially lighter in weight would be highly desirable by the world's major aircraft manufacturers.

SUMMARY OF THE INVENTION

The present invention is an improved thrust reverser having laterally deployable deflecting elements which pivot into the thrust jet downstream of the thrust nozzle. The improved thrust reverser has all the requirements of the most modern and desirable type of reverser and in addition the deflecting elements are constructed of thin flexible material. This type of construction greatly reduces the weight of the conventional structure as well as reducing the initial economic and replacement costs.

These and further features and advantages of the present invention will become more obvious from the following description when taken in conjunction with the accompanying drawings, which show, for purposes of illustration only, an embodiment in accordance with the present invention.

BRIEF DESCRIPTION OF THE DRAWINGS

FIG. 1, is a side of the reversing apparatus showing the upper deflecting membrane door in its deployed position and a phantom showing of the upper and lower membrane doors in their stowed position.

FIG. 2, is a plan view of the showing of FIG. 1, with the upper membrane door stowed.

FIG. 3, is a section of FIG. 1 taken along lines 3—3 of FIG. 1.

FIG. 4, is a section of FIG. 2 taken along lines 4—4 of FIG. 2.

DETAILED DESCRIPTION OF THE PREFERRED EMBODIMENT

Throughout the drawings and specifications, the same numerals are used in the various figures to indicate the identical element on part.

Referring now to FIG. 1, there is shown a side view of a rear portion of a fan jet engine 10 for operation of an aircraft. The engine is enclosed within a cowl 12. The cowl has a forward section 14 and a rearward section 16. The cowl section 16 is comprised of a pair of membrane blocker doors 17 that form a continuation of the streamlined cowl profile when in this stowed position and reverse the flow of bypass fan gas when in a deployed position. The cowl and stowed membrane blocker doors are spaced from the engine providing a bypass fan gas duct 18 between the inner cowl surface and the engine nozzle 20.

The membrane blocker doors 17 are rotatable between their stowed and deployed position by a like pair of actuating mechanisms positioned on each side of the aircraft rearward of cowl section 14 with the membrane blocker doors positioned therebetween, see FIG. 2. The mechanism is concealed and streamlined by a pair of stang farrings 22, best seen in FIG. 2.

The rotating mechanisms include a linear actuator 24 operating a translatable bogie 26 within a fixed positioned birdcage base member 28 attached to the forward cowl porition 14 and the aircraft air frame (not shown). A bogie 26 is pivotally attached at its outer vertical extremities to one end of a pair of short links 27 which are each in turn pivotally attached at their other end to the arms 30. The arms 30 are attached at one end to the forward lower corner of the membrane blocker doors 17. The arms 30 pivot about a pivot point 31 at about the longitudinal upper center of the birdcage 28. Pivotally attached to the rear lower corners of the membrane blocker doors are second arm 32 whose other end is pivotally attached to the rearward most vertical corner of the birdcages 28.

The membrane blocker doors 17 are constructed of a single lighweight skin having sufficient strength to perform as a thrust reversing door for an aircraft of given size. The skin of door 17 reacts to pressure loads in hoop tension and is stablized by end plates 34 and 35 along the forward and rear surfaces respectively of the door. The arms 30, 32 attach to the doors along the longitudinal surfaces of the blocker doors to a U shaped portion 38 of a hinge member 36. The upper portion 40 of the hinge member 36 is secured to the membrane skin in a conventional manner such as welding or the like. The hinge member and attaching arm can be best seen in FIGS. 3 and 4.

The birdcage assemblies 28 are well known in this art and need no further explanation. The actuator 24 may be of any linear type such as, but not limited to, electric solenoids, jack screws, hydraulic actuator and the like. In the preferred embodiment, hydraulic actuators are chosen for ease of discussion. The membrane material for the blocker doors 17 are made of flexible, thin, heat resistant material such as, but not limited to, stainless steel or like having a high strength and required flexibility to perform the operation for which the doors are utilized.

OPERATION OF THE PREFERRED EMBODIMENT

In normal flight, the membrane thrust reverser doors are in a stowed position shown in phantom in FIGS. 1 and 2. In the blocker door stowed position, the gasses from the bypass fan exit the rear of the aircraft through duct 18 and providing a forward thrust component to the aircraft.

When upon landing or stopping the aircraft ground roll, the reverser mechanism is energized actuating the blocker doors to their deployed position, the upper door only shown in FIG. 2 as the lower door operates in the same manner, where the rearward flow of gases from duct 18 are blocked in their rearward exit from the aircraft and turned upward and forward by the action of the blocker doors. The gases exiting the rear portion of the aircraft now exit in a direction toward the forward end or nose of the aircraft causing a reverse thrust component to the aircraft.

The blocker doors are in a first stowed position, shown in phantom in FIGS. 1 and 2, the hydraulic pressure applied causing the shaft 42 attached to bogie 26 to move forward. As the bogie moves forward, the short links 27 pull the end of arm 30 downward about their pivot 31 causing the forward portion of arm 30 to move outward toward the cowl. As the forward surface of the blocker doors move outward with arm 30, rear arm 32 moves accordingly until the blocker door is in its fully deployed position, see upper door FIG. 1. The blocker doors are returned to their stowed position in the same manner by a reversal of the action of the hydraulic cylinder and rod.

It has been seen that the reversing membrane blocker doors and the mechanism that moves the doors between their stowed and deployed positions are light in structural weight, economical to fabricate and reliable in their movements. The reversal of the bypass gases is exceptionally efficient and there are little or no complicated moving parts.

Many changes may be made in details of the instant invention, in the method and material of fabrication, in the configuration and assemblage of the constituent elements, without departing from the spirit and scope of the appended claims, which changes are intended to be embraced therewithin.

Having thus described the invention, what is claimed as new and useful and desired to be secured by United States Letters Patent is:

1. A thrust reversal system for an aircraft jet engine enclosed in a nacelle having an aerodynamic profile comprising, a thrust reverser door formed of thin flexible sheet material moveable between a stowed and a deployed position and actuator means for moving said thrust reverser door between said positions, each longitudinal edge of said thrust reverser door is flexibly attached by an elongated hinge to a rigid member connected to said actuator means.

2. A thrust reversal system for an aircraft jet engine enclosed in a nacelle having an aerodynamic profile comprising, a thrust reverser door formed of thin flexible sheet material moveable between a stowed and a deployed position, and an actuator means for moving said reverser door between said positions, the leading edge of said thrust reverser door comprises a rigid curvilinear member for providing an aerodyanimc profile to said thrust reverser door when said thrust reverser is in a stowed position and each longitudinal edge of said thrust reverser door includes a flexibly attached, rigid member connected to said actuator means.

3. The invention as defined in claim 2, wherein the flexible attachment of said blocker door to said rigid member comprises an elongated hinge.

* * * * *